UNITED STATES PATENT OFFICE.

JAMES B. CARMICHAEL, OF SEATTLE, WASHINGTON, ASSIGNOR OF ONE-HALF TO HINE J. HARPER, OF SEATTLE, WASHINGTON.

COMPOSITION OF MATTER TO BE USED FOR PRESERVING GRAPHITE CRUCIBLES.

1,207,858.   Specification of Letters Patent.   Patented Dec. 12, 1916.

No Drawing.   Application filed January 28, 1916.   Serial No. 74,941.

*To all whom it may concern:*

Be it known that I, JAMES B. CARMICHAEL, citizen of the United States, residing at Seattle, in the county of King and State of Washington, have invented a certain new and useful Composition of Matter to be Used for Preserving Graphite Crucibles, of which the following is a specification.

My composition consists of the following ingredients as stated, viz.:

| | |
|---|---|
| Pulverized glass | 18 ounces |
| Pulverized pumice | 9 ounces |
| Saturated solution of sodium silicate | 1 quart |

First, the pulverized glass and the pulverized pumice are thoroughly intermixed and then disposed in a suitable vessel whereupon the saturated solution of sodium silicate is then poured into said vessel and thereupon said ingredients are thoroughly mingled by agitation.

In using the above named composition it is applied by means of a brush, thoroughly to coat the inner and outer surfaces of the graphite crucible to be preserved after which coating such coating is allowed to dry and thereupon said graphite crucible will be ready for use in the operation of melting metal.

By the use of the above composition, a graphite crucible may be caused to withstand high temperatures under normal conditions of use for a much longer period of time than would the same graphite crucible if it be not coated with said composition.

What I claim is:

1. The herein-described composition of matter consisting of pulverized glass, pulverized pumice and a saturated solution of sodium silicate in substantially the proportions specified.

2. The herein-described composition of matter for preserving graphite crucibles, consisting of pulverized glass eighteen ounces, pulverized pumice nine ounces, and a saturated solution of sodium silicate one quart, substantially as described.

In witness whereof, I hereunto subscribe my name this 11th day of January A. D., 1916.

JAMES B. CARMICHAEL.

Witnesses:
FRANK WARREN,
O. JOHNSON.

Copies of this patent may be obtained for five cents each, by addressing the "Commissioner of Patents, Washington, D. C."